United States Patent [19]

Inoue

[11] 4,447,070

[45] May 8, 1984

[54] FIFTH WHEEL

[75] Inventor: Akira Inoue, Kitakyushu, Japan

[73] Assignee: Hitachi Metals, Ltd., Japan

[21] Appl. No.: 498,642

[22] Filed: May 27, 1983

Related U.S. Application Data

[63] Continuation of Ser. No. 228,183, Jan. 26, 1981, abandoned.

[30] Foreign Application Priority Data

Oct. 29, 1980 [JP] Japan .......................... 55-154349[U]

[51] Int. Cl.³ .............................................. B62D 53/12
[52] U.S. Cl. ..................................... 280/434; 280/440
[58] Field of Search ............... 280/434, 433, 435, 436, 280/437, 438 R, 440, 508, 510, 512, 513, 514; 410/64, 62

[56] References Cited

U.S. PATENT DOCUMENTS

| | | | |
|---|---|---|---|
| 3,759,546 | 9/1973 | Slaven | 280/434 |
| 3,888,514 | 6/1975 | Klein | 280/434 |
| 4,394,030 | 7/1983 | Inoue | 280/434 |

FOREIGN PATENT DOCUMENTS 2508255 9/1976 Fed. Rep. of Germany ...... 280/434
646631 10/1962 Italy .................................... 280/434
55-123572 9/1980 Japan .................................. 280/433

Primary Examiner—Joseph F. Peters, Jr.
Assistant Examiner—Mitchell J. Hill
Attorney, Agent, or Firm—Finnegan, Henderson, Farabow, Garrett & Dunner

[57] ABSTRACT

A fifth wheel provided on a tractor and adapted to be connected to a king pin fixed to a trailer. The fifth wheel comprises a base plate provided with a slot for receiving the king pin, a stationary lock fixed to the portion of the base plate near the terminal end of the slot and provided with a semi-circular recess, a movable lock pivotally supported by a vertical shaft and including a main body provided with a semi-circular recess and a hook adapted to contact the front end of the king pin when the latter moves into the slot, a spring adapted to hold the movable lock in the open position, a retainer piece movable along a guide on the base plate and adapted to hold the movable lock in the closed position, a bar connected to the retainer piece and provided with a spring for holding the retainer piece to hold the movable lock in the closed position, and projections on the bar for engaging with the base plate for holding the bar at the opened and closed positions.

14 Claims, 11 Drawing Figures

FIFTH WHEEL

This is a continuation of application Ser. No. 228,183 filed Jan. 26, 1981 now abandoned.

BACKGROUND OF THE INVENTION

The present invention relates to a fifth wheel which is provided on a tractor and adapted to be connected to a king pin fixed to a trailer.

Such a mechanism for connecting a king pin to a fifth wheel has been known as having two locks adapted to be swung to the left and right around lock pins to lock and release the king pin. This known mechanism is, however, faced with a problem in that the inner surfaces of the locks contactable with the king pin are quickly worn down due to repeated start and stop of the tractor, resulting in decrease in comfort of the tractor driver.

Another known mechanism includes a C-shaped lock adapted to be rotated around a lock pin to retain the king pin by a wedging action. In this mechanism, a part of the periphery of the king pin is always kept open leaving a considerable amount of play. This mechanism, therefore, is not satisfactory as a mechanism for connecting the king pin to the fifth wheel. In addition, if the king pin is located at a higher position than the lock, the latter locks only the lower part of the king pin, resulting in an imperfect connection. If the tractor starts in this condition, the king pin may be dangerously disengaged from the lock possibly causing a serious accident such as the trailer falling off.

The specification of British Pat. No. 1407084 proposes an improved mechanism intended for overcoming the above-described problems of the prior art. This mechanism is constituted by a coupling member, slot, coupling hook, latch, operating bar, spring means, connecting bar and other members. In this mechanism, however, the coupling hook and the latch, which make sliding contact with each other, are worn down rapidly the shortening of the life of the latch and hook. In addition, as will be understood from FIG. 1 attached to the specification of the above-mentioned British Patent, the hook does not engage the whole peripheral surface of the pin rather the left upper part of the pin is left open. This arragement causes considerable play, resulting in decreased driver comfort. In addition, the pin is engaged solely by the curved jaw portion of the hook and there is no other member taking part in the locking of the pin. This construction cannot be considered perfect from the view point of safety.

SUMMARY OF THE INVENTION

Accordingly, an object of the invention is to provide a fifth wheel which permits connection to the king pin only when the latter is in the right position in relation to the fifth wheel and which can suppress any play or looseness after the connection is made to afford improved safety and comfort to the driver.

To this end, according to the invention, there is provided a fifth wheel provided on a tractor and adapted to be connected to a king pin fixed to a trailer, the fifth wheel comprising a base plate, a stationary lock, a movable lock including a main body and a hook integral with each other, a retainer piece, a bar and means for holding the bar either at an opened position or at a closed position.

The base plate is provided with a slot for receiving the king pin, while the stationary lock has a semi-circular recess for engaging the king pin and is fixed to the portion of the base plate near the terminal end of the slot.

The movable lock is supported by a vertical shaft for free pivotal movement and has an integral construction including a main body having a semi-circular recess for engaging the king pin and a hook adapted to contact the front end of the king pin when the latter comes into the slot. The movable lock is further provided with a spring for holding the movable lock in the opened position.

The retainer piece is adapted to move along a guide provided on the base plate and is adapted to hold the movable lock at its closed position.

The bar is connected to the retainer piece and is provided with a spring which acts on the bar to hold the retainer piece when the movable lock is in the closed position.

The stationary lock, movable lock, retainer piece and the vertical shaft supporting these members may be housed by a box which is adapted to be detachably and mechanically secured to the fifth wheel plate. This arrangement permits easy protective maintenance of the whole mechanism, as well as easy replacement of worn out parts.

It is also preferred to connect a resilient member between the above-mentioned box and the fifth wheel plate because such a resilient member contributes remarkably to the prevention of wear, as well as to increased durability and improved comfort.

DESCRIPTION OF THE PREFERRED EMBODIMENTS

The invention will be more fully understood from the following description of the preferred embodiments taken in conjunction with the accompanying drawings.

Figure 1:
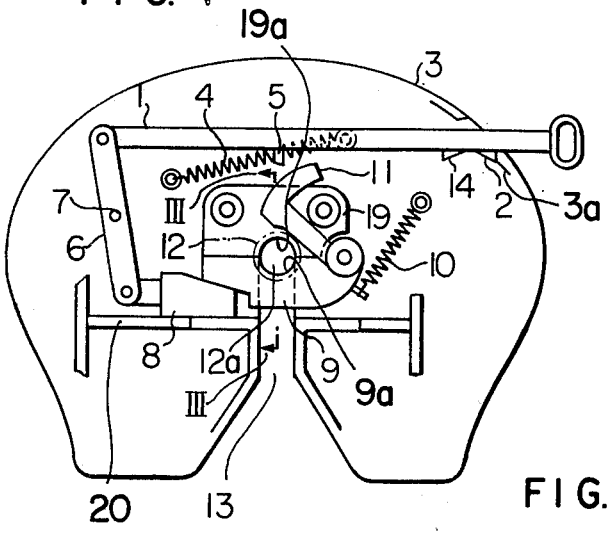
FIG. 1 is a bottom plan view of the fifth wheel in the locked state.
Figure 2:
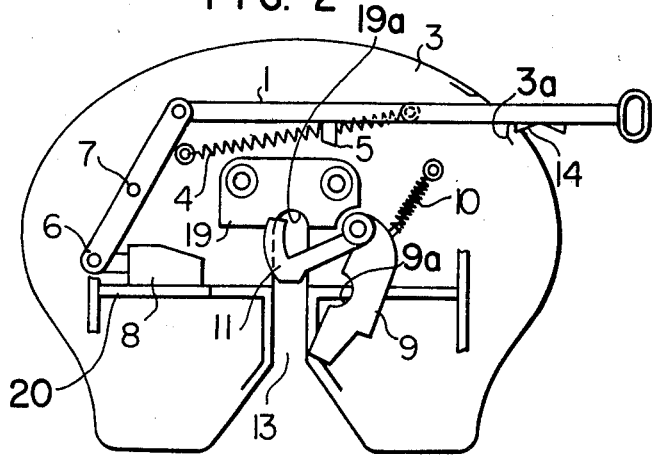
FIG. 2 is a bottom plan view of the fifth wheel in the released state.

For releasing the fifth wheel from the locked state shown in FIG. 1, a bar 1 is pulled forwardly (toward the top of the drawings) rightwardly as viewed in the Figure, so that a projection 2 of bar 1, which otherwise serves to hold bar 1 in the locked position, is disengaged from edge abutment 3a on fifth wheel plate 3. Then, as the bar 1 is pulled rightwardly, a spring 4 is stretched and also latch 5 which is fixed to bar 1, moves to the right. In consequence of the movement of bar 1, a link 6 is rotated to the right around a pin 7, so that a retainer piece 8 is moved to the left to disengage from contact with the main body 9 of the movable lock. As shown in FIGS. 1 and 2, stationary lock 19 has a semi-circular recess 19a for engaging approximately one-half of the circumference of king pin 12. Main body 9 has a semi-circular recess 9a for engaging the other one-half of the circumference of king pin 12.

In this condition, although the main body 9 is pulled and urged to rotate in the counter-clockwise direction by a spring 10, the king pin 12 is still connected to the fifth wheel because the king pin 12 precludes any movement of hook 11 and the main body 9, which is integral therewith. Then, as the tractor is moved ahead, the hook 11 and the main body 9 as a unit are rotated counter-clockwise so that the king pin 12 is released from the fifth wheel plate 3 to the state shown in FIG. 2.

The king pin 12 can be connected to the fifth wheel plate 3 in the releasing state shown in FIG. 2, in a manner explained hereinbelow. As the king pin 12 comes into a slot 13, the front end of the king pin 12 comes into contact with the hook 11, so that the hook 11 and the main body 9 as a unit are rotated clockwise overcoming the pulling force of the spring 10.

Then, as the king pin 12 comes deeper into the slot 13 to a position near the terminal end of the latter, the front end of the hook 11 contacts the latch 5 and pushes the bar 1 forwardly and rightwardly as viewed in the drawings to move the latter clear of edge abutment 3a. As a result, the projection 14 of the bar 1 disengages from edge abutment 3a the fifth wheel plate 3 and the spring 4 contracts to pull the bar 1 to the left to cause a counter-clockwise rotation of the link 6 around the pin 7. Projection on bar 1 serves otherwise to hold bar 1 in the unlocked position.

In consequence, the retainer piece 8 is moved to the right and is guided by rigid member 20 connected to fifth wheel plate 5 (see FIGS. 1 and 2), to retain the main body 9 of the movable lock thus completing the connection of the king pin 12 to the fifth wheel plate 3.

In the locked state shown in FIG. 1, the spring 4 is retained at its left end by the fifth wheel plate 3 and at its right end by the bar 1, respectively. In addition, the left end of the spring 4 is located to the rear of bar 1 (toward the bottom of the drawing). Therefore, the projection 2 of the bar 1 is aligned to engage edge abutment 3a during any accidental rightward movement of bar 1 and is thus securely retained by the fifth wheel plate 3, and accidental falling off of the trailer during operation of the tractor-trailer is completely avoided to ensure greater safety. The king pin 12 is inserted in a king pin hole 12a in the main body 9 and a stationary lock 19.

Figure 3:
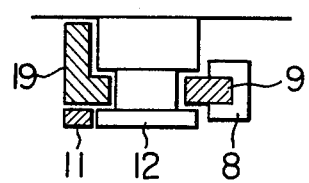
FIG. 3 is a sectional and schematic view surounding a king pin taken along the line III—III of FIG. 1.

Furthermore, as will be seen from FIG. 3, the hook 11 makes contact with the lower part of the king pin 12 when the latter comes into the slot 13, (see FIG. 2). Thereafter, the main body 9 of the movable lock engages the king pin 12 and then retained by the retainer piece 8. Therefore, when the king pin 12 takes an incorrect elevated position, the king pin 12 does not contact with the hook 11, main body 9 does not rotate into locking position, and hook 11 does not trip bar 1 via latch 5 (and thus retainer 8) into locking position, so that it is never connected to the fifth wheel plate. Thus, the undesirable mis-locking is completely avoided.

Figure 4:
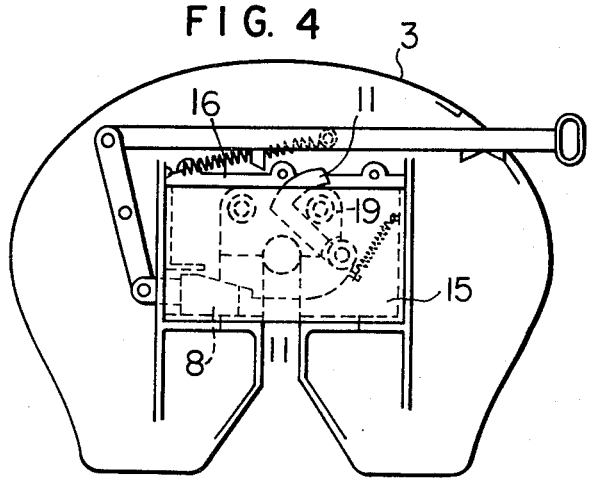
FIGS. 4 to 11 are bottom plan views of different embodiments of the invention.

FIG. 4 shows another embodiment of the invention in which the stationary lock 19, hook 11, main body 9 and the retainer piece 8 are housed by a box 15 which is detachably secured to the lower side of the fifth wheel plate 3. This box 15 is attached to the fifth wheel plate 3 by means of a fixing member 16, so that the major parts for connecting the king pin 12, namely the stationary lock 19, movable lock constituted by the hook 11 and main body 9, and the retainer piece 8, can easily be taken out by detaching the box 15. In this manner protective maintenance, as well as inspection and replacement of these parts, is facilitated considerably.

Figure 5:
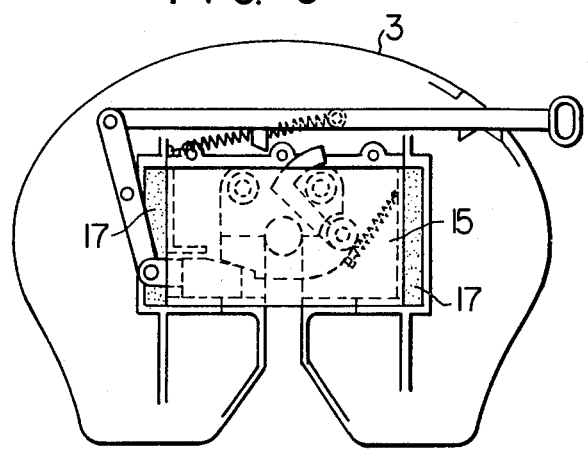

FIG. 5 shows still another embodiment in which a resilient member 17 is interposed between the box 15 and the fifth wheel plate 3. This arrangement not only affords an easy inspection and replacement of the major parts but also provides a buffering effect to remarkably improve the durability of these parts, as well as comfortableness of the driver and fellows.

Figure 6:
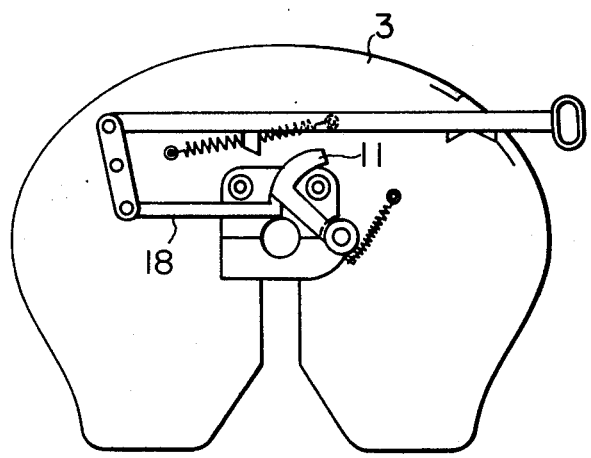
Figure 7:
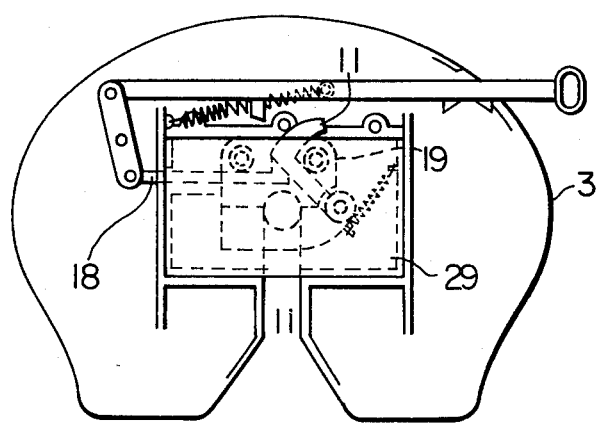
Figure 8:
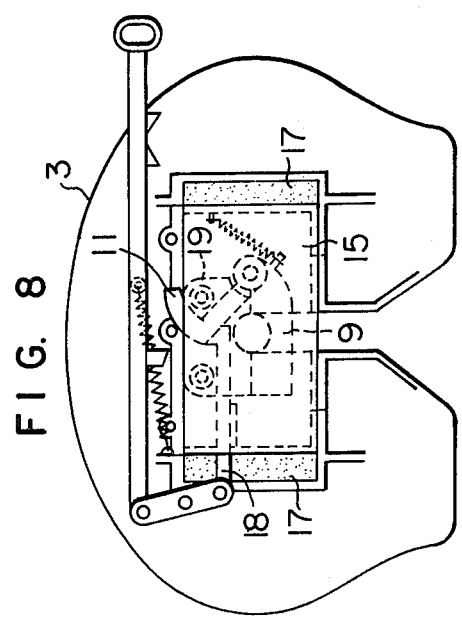

FIGS. 6, 7 and 8 shows different embodiments in which a hook 11 is retained by a retainer piece 18 as opposed to main body 9 being retained by retainer piece 8. These embodiments operate in the same manner as the embodiments shown in FIGS. 1, 2, 4 and 5, and offer the same advantage provided by the latter.

Figure 10:
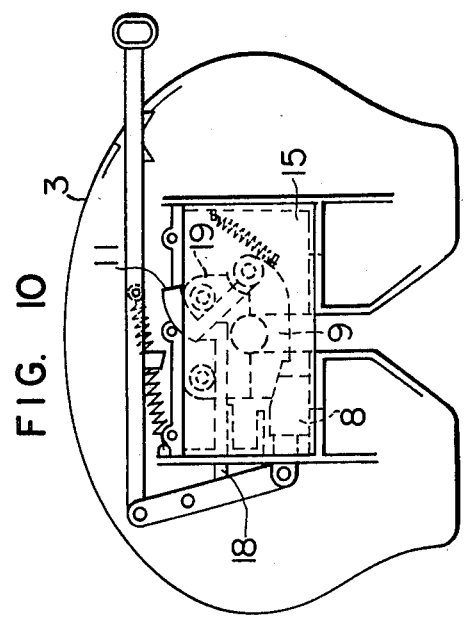
Figure 11:
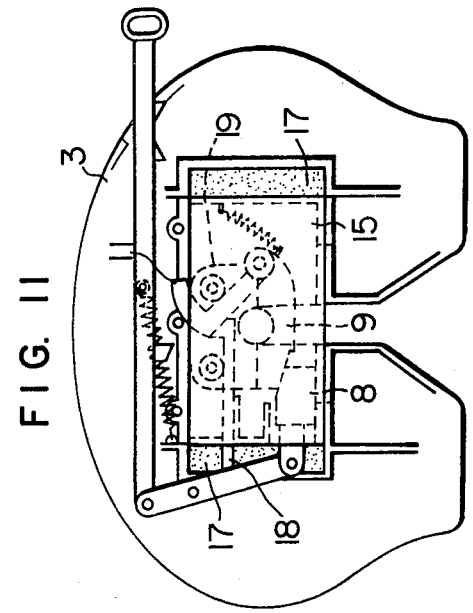
Figure 9:
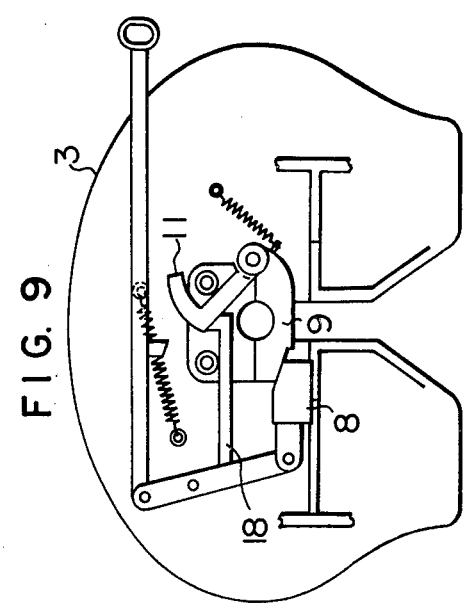

FIGS. 9, 10 and 11 show different embodiments in which the main body 9 is retained by the retainer piece 8, while the hook 11 is retained by the retainer piece 18.

As will be understood from the foregoing description, the fifth wheel of the present invention offers the following advantages:

(1) prevention of mis-locking or imperfect locking to enhance the safety,
(2) easier inspection and replacement of parts,
(3) reduction of wear and improved durability of the parts; and
(4) improved comfortableness of the tractor driver.

What is claimed is:

1. A fifth wheel provided on a tractor and adapted to be connected to a generally cylindrical king pin fixed for a trailer, said fifth wheel comprising:

a base plate having a longitudinal slot for receiving the king pin;
a stationary lock rigidly secured to said base plate and having a semi-circular shaped recess straddling said slot and adapted to engage approximately one-half of the circumference of said king pin;
a pivotally mounted lock supported on said base plate for pivotal movement between an opened and closed position, said lock having (i) a main body provided with a semi-circular shaped recess for straddling said slot adjacent said stationary lock, and for engaging approximately the remaining one-half of the circumference of said king pin, when said pivotally mounted lock is in the closed position, (ii) a hook having a curved end, and having a straight end integral with said main body and adapted to contact and be pivoted by said king pin as said king pin enters said slot when said pivotally mounted lock is in the opened position, thereby pivoting said main body toward the closed position, and (iii) means for biasing said pivotally mounted lock toward the opened position;
retainer means including at least one retainer piece slidably mounted on said base plate for releasably engaging said pivotally mounted lock, said retainer piece being adapted to securely hold said pivotally mounted lock in the closed position;
a longitudinal bar having two ends, with one end connected to said retainer piece, and means connected to said bar for biasing said bar so as to cause said retainer piece to engage said pivotally mounted lock and securely hold it in the closed position;
at least one projection on said bar situated proximately to the other end of said bar for engaging said base plate to thereby securely hold said bar in a first position or a second position, as desired, such that said retainer piece is securely held in the opened or closed position, respectively; and
a latch protruding from said bar between said two ends thereof, said bar and latch being positioned, and said latch being adapted, so as to co-act with said curved end of said hook when said pivotally mounted lock pivots from the opened to the closed position to thereby cause said projection on said bar to disengage from said base plate for permitting said retainer piece to slide under the influence of the biasing force exerted by said means connected to said bar and to engage said pivotally mounted lock and hold said lock in the closed position.

2. A fifth wheel as claimed in claim 1, wherein said means for biasing said pivotally mounted lock comprises a spring secured between said base plate and said pivotally mounted lock.

3. A fifth wheel as claimed in claim 1, wherein said means for biasing said bar comprises a spring secured between said base plate and said bar.

4. A fifth wheel as claimed in claim 1, further comprising a rigid guide for guiding said retainer piece as it slides and holds said pivotally mounted lock, wherein said guide includes a rigid member connected to said base plate.

5. A fifth wheel as claimed in claim 1, further comprising a link rotatably mounted on a pin provided on the base plate and mechanically connected to said bar and said retainer piece for transmitting motion therebetween.

6. A fifth wheel as claimed in claim 1, wherein said retainer piece is adapted to retain said main body of said pivotally mounted lock.

7. A fifth wheel as claimed in claim 1, wherein said retainer piece is adapted to retain said hook of said pivotally mounted lock.

8. A fifth wheel as claimed in claim 1, wherein said retainer means is adapted to retain both of said main body and and said hook of said pivotally mounted lock, said retainer means including at least two retainer pieces connected to said one bar end, one of said at least two retainer pieces retaining said main body and the other of said at least two retainer pieces retaining said hook.

9. A fifth wheel as claimed in claim 1, wherein said base plate comprises a fifth wheel plate.

10. A fifth wheel as claimed in claim 1, wherein said base plate includes a box-like structure detachably secured to said base plate.

11. A fifth wheel as claimed in claim 10 further comprising a resilient member interposed between said base plate and said box-like structure.

12. A fifth wheel as claimed in claim 10, wherein said box-like structure is fixed to said base plate by means of a fixing member.

13. A fifth wheel as claimed in claim 10, wherein said bar is movably attached to said base plate.

14. A fifth wheel as claimed in claim 13, further comprising a link rotatable around a pin provided on said base plate for mechanically connecting said one end of said bar to said retainer piece.

* * * * *